(12) United States Patent
Huang et al.

(10) Patent No.: US 11,531,398 B1
(45) Date of Patent: Dec. 20, 2022

(54) GYROSCOPIC PRECESSION ENGINE FOR WEARABLE DEVICES

(71) Applicant: Apple Inc., Cupertino, CA (US)

(72) Inventors: XiaoYi Huang, Union City, CA (US); George Ho Yin Mak, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/408,364

(22) Filed: Aug. 20, 2021

(51) Int. Cl.
*G06F 3/01* (2006.01)
*H02P 5/50* (2016.01)

(52) U.S. Cl.
CPC ............ *G06F 3/016* (2013.01); *G06F 3/012* (2013.01); *H02P 5/50* (2013.01)

(58) Field of Classification Search
CPC ........ G06F 3/011; G06F 3/012; G06F 3/0346; A63F 13/211; A63F 13/28; A63F 2300/8082; G08B 6/00; G02B 27/0176
See application file for complete search history.

(56) References Cited

U.S. PATENT DOCUMENTS

| | | | | |
|---|---|---|---|---|
| 6,695,794 B2 * | 2/2004 | Kaiser | ................... | A61H 23/02 600/595 |
| 8,092,398 B2 * | 1/2012 | Weinberg | ................. | A61H 3/00 600/595 |
| 9,918,663 B2 * | 3/2018 | Singhatat | ............... | A61B 5/742 |
| 10,202,208 B1 * | 2/2019 | Sanyal | ................... | B64G 1/286 |
| 10,518,910 B1 * | 12/2019 | Romano | ................ | G01C 19/04 |
| 10,553,030 B2 * | 2/2020 | Schwartz | ............... | G06V 20/20 |
| 10,688,376 B2 * | 6/2020 | Filipich | .............. | A63C 17/0013 |
| 10,874,575 B2 * | 12/2020 | Lee | ........................ | A61B 5/1038 |
| 2003/0160132 A1 * | 8/2003 | Osterberg | ............... | F16F 15/22 244/165 |
| 2004/0035229 A1 * | 2/2004 | Meffe | .................... | B64G 1/286 74/5.6 A |

(Continued)

FOREIGN PATENT DOCUMENTS

WO    WO-2022024142 A1 *  2/2022

OTHER PUBLICATIONS

Jacot et al, Control Moment Gyros in Attitude Control, Journal of Spacecraft and Rockets vol. 3 No. 9, Sep. 1966, pp. 1313-1320 (Year: 1966).*

*Primary Examiner* — William Lu
(74) *Attorney, Agent, or Firm* — Fish & Richardson P.C.

(57) ABSTRACT

Embodiments are disclosed for a gyroscopic precession engine for wearable devices. In an embodiment, a wearable device comprises: a support structure including at least one attachment mechanism for attaching the support structure to a human body part; at least one gyroscopic precession engine coupled to the support structure, the gyroscopic precession engine, comprising: a first motor configured to rotate a wheel mount at a first angular velocity; at least one wheel rotatably coupled to the wheel mount and configured to spin at a second angular velocity different than the first angular velocity; a second motor configured to spin the wheel at the second angular velocity; and at least one motor controller coupled to the first motor and the second motor, the at least one motor controller configured to rotate the wheel mount at the first angular velocity and spin the wheel at the second angular velocity, thereby producing a torque in a desired direction.

14 Claims, 4 Drawing Sheets

(56) References Cited

U.S. PATENT DOCUMENTS

| | | | | |
|---|---|---|---|---|
| 2009/0087029 | A1* | 4/2009 | Coleman | G06V 10/255 |
| | | | | 382/103 |
| 2009/0121399 | A1* | 5/2009 | Hindle | F16F 15/005 |
| | | | | 310/90 |
| 2009/0192674 | A1* | 7/2009 | Simons | B60G 17/021 |
| | | | | 701/37 |
| 2011/0043755 | A1* | 2/2011 | Gibson-Horn | A61F 5/026 |
| | | | | 351/203 |
| 2014/0180184 | A1* | 6/2014 | Duguid | A61H 3/00 |
| | | | | 601/87 |
| 2014/0260714 | A1* | 9/2014 | Vallery | G01C 19/04 |
| | | | | 74/5.37 |
| 2016/0063828 | A1* | 3/2016 | Moussette | G06F 3/04842 |
| | | | | 340/691.5 |
| 2016/0098084 | A1* | 4/2016 | Hwang | G06F 1/1626 |
| | | | | 345/173 |
| 2016/0124707 | A1* | 5/2016 | Ermilov | G06F 3/04815 |
| | | | | 345/156 |
| 2016/0175702 | A1* | 6/2016 | Black | G02B 27/0172 |
| | | | | 463/31 |
| 2017/0262020 | A1* | 9/2017 | Patel | G06F 1/163 |
| 2017/0337737 | A1* | 11/2017 | Edwards | F16M 13/04 |
| 2018/0008141 | A1* | 1/2018 | Krueger | A61B 3/14 |
| 2018/0096535 | A1* | 4/2018 | Schwartz | G02B 27/017 |
| 2018/0129484 | A1* | 5/2018 | Kannan | G06F 3/0482 |
| 2019/0059733 | A1* | 2/2019 | Nguyen | A61F 5/0118 |
| 2019/0235628 | A1* | 8/2019 | Lacroix | G06F 3/01 |
| 2019/0317614 | A1* | 10/2019 | Ardouin | G06F 3/011 |
| 2020/0010222 | A1* | 1/2020 | Halle | B64G 1/285 |
| 2020/0147382 | A1* | 5/2020 | Caban | A61B 5/0024 |
| 2022/0049957 | A1* | 2/2022 | Anderson | G01C 19/30 |

* cited by examiner

GYROSCOPIC PRECESSION ENGINE FOR WEARABLE DEVICES

TECHNICAL FIELD

This disclosure relates generally to haptic systems for wearable devices

BACKGROUND

Extended Reality (XR), which includes Virtual Reality (VR) and Augmented Reality (AR) mediums enable consumers to immerse themselves in content. With increased consumer interest there is a greater need for immersive content to be created for XR. Haptic engines are an important aspect of XR, as they impart physical sensations on a user's body that enhances the user's immersive experience. Typical haptic engines found in smart phones and other mobile devices, however, only provide vibrations along a single axis. Haptic engines that produce vibrations are useful for notification applications, but cannot provide a continuous torque or force on wearable devices, such as a head-mounted display (HMD).

SUMMARY

Embodiments are disclosed for a gyroscopic precession engine for wearable devices.

In an embodiment, a wearable device comprises: a support structure including at least one attachment mechanism for attaching the support structure to a human body part; at least one gyroscopic precession engine coupled to the support structure, the gyroscopic precession engine, comprising: a first motor configured to rotate a wheel mount at a first angular velocity; at least one wheel rotatably coupled to the wheel mount and configured to spin at a second angular velocity; a second motor configured to spin the wheel at the second angular velocity different than the first angular velocity; and at least one motor controller coupled to the first motor and the second motor, the at least one motor controller configured to rotate the wheel mount at the first angular velocity and spin the wheel at the second angular velocity, wherein the wheel mount is configured, when spinning, to move in free space in response to a torque produced by a product of the first angular velocity of the wheel mount and the second angular velocity and a moment of inertia of the wheel, and wherein the wearable device moves in response to a force produced by the torque.

In an embodiment, the wearable device includes a motion controller coupled to the first motor and configured to provide a control signal to the first motor indicative of a motion profile.

In an embodiment, first motor is a server motor that receives the control signal and in response rotates the wheel mount in accordance with the motion profile.

In an embodiment, the wheel has a radius that is less than or equal to 0.03 meters and a thickness that is less than or equal to 0.01 meters.

In an embodiment, the angular velocity of the wheel mount is greater or equal to 600 radians per second and the angular velocity of the wheel is greater than or equal to 200 radians per second.

In an embodiment, the wearable device is a head-mounted display and the human body part is a human head.

In an embodiment, the attachment mechanism further comprises padding that is configured to be disposed between the head-mount display and the user's head.

In an embodiment, at least one of a size, weight, shape or location of the padding is configured to provide a counterbalance to a weight of one or more gyroscopic precession engines.

In an embodiment, the support structure includes a mechanical torque amplifier or redirector for amplifying or redirecting the torque.

In an embodiment, the wearable device includes three gyroscopic precession engines that provide three forces along three mutually orthogonal directions to generate yaw, pitch and roll rotations in a head-centered coordinate system.

In an embodiment, a method comprises: detecting, with a processor of a wearable device, trigger event data for a trigger event associated with content playing on the wearable device or another device; generating, by a motion controller, a control signal in response to the detected trigger event data; and receiving, by a server motor coupled to the wearable device, the control signal and, in response to the control signal, rotating a wheel mount at a first angular velocity coupled to a wheel rotating at a second angular velocity, thereby applying a force on the wearable device.

In an embodiment, the wearable device is a head-mounted display and the trigger event data indicates when the force is to be applied to the wearable device, so as to be in sync with the trigger event.

In an embodiment, the control signal includes a motion profile that indicates at least one axis of rotation in a head centered coordinate system to be affected by the force.

In an embodiment, the trigger condition data includes at least one of a trigger event start time, time offset, duration, frame number or frame offset associated with running or elapsed time of the content.

Other embodiments can include an apparatus, computing device and non-transitory, computer-readable storage medium.

Particular embodiments described herein provide one or more of the following advantages. A gyroscopic precession engine is disclosed that provides a continuous torque/force sensation along multiple degrees of freedom. The gyroscopic precession engine can be mounted to, or embedded in, a head-mounted display (HMD) or other wearable device to provide spatial guidance in VR and AR applications by, for example, guiding the user's head in a particular direction in sync with the immersive visual content viewed by the user.

The gyroscopic precession engine also improves immersive media content for movies and games by providing a continuous torque/force on a user's head/neck or other body part that is synced with visual content, such as creating a sensation of air wave pressure (e.g., from an explosion scene), creating a sensation of centrifugal force (e.g., a bumpy roller coaster ride or car racing), head/neck/hand/wrist exercising (e.g., providing a counter torque to the user's motion), ergo correction (e.g., notify or guide the user to a fix bad sitting or standing posture) and providing reaction force feedback in VR applications (e.g., boxing an object and feeling a reaction force on the hand/wrist).

The details of one or more implementations of the subject matter are set forth in the accompanying drawings and the description below. Other features, aspects and advantages of the subject matter will become apparent from the description, the drawings and the claims.

DETAILED DESCRIPTION

Figure 1A:
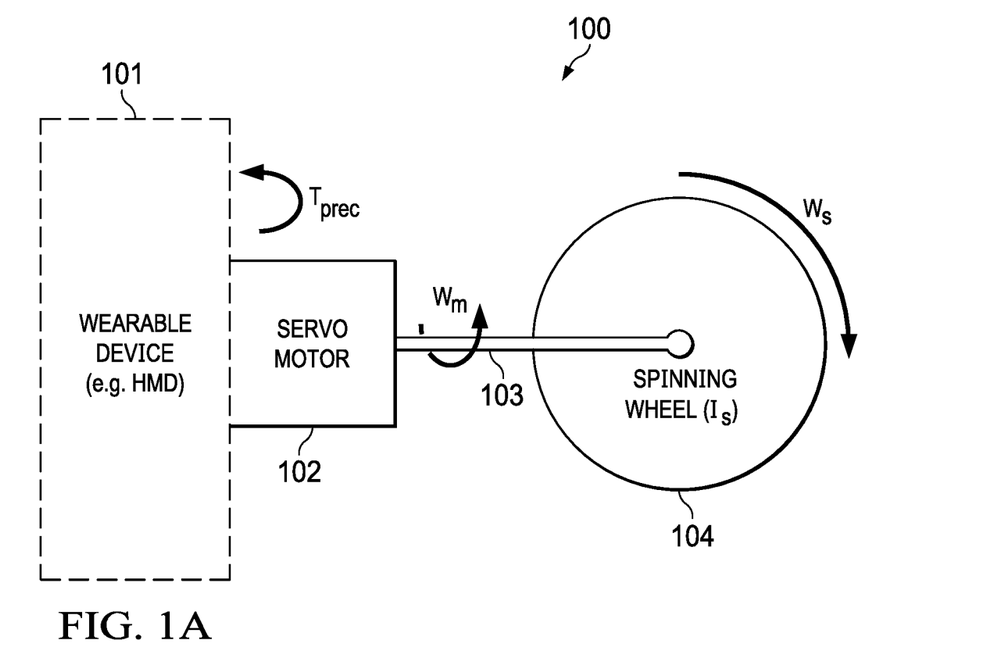
FIGS. 1A-1C illustrate a gyroscopic precession engine for providing torque/force on a user's head, according to an embodiment.
Figure 1B:
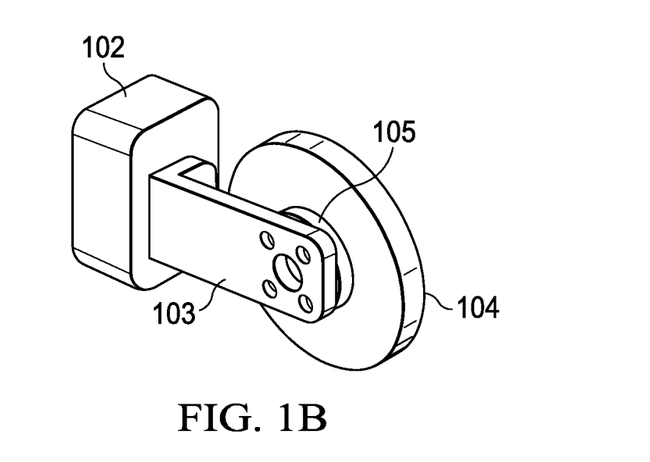
Figure 1C:
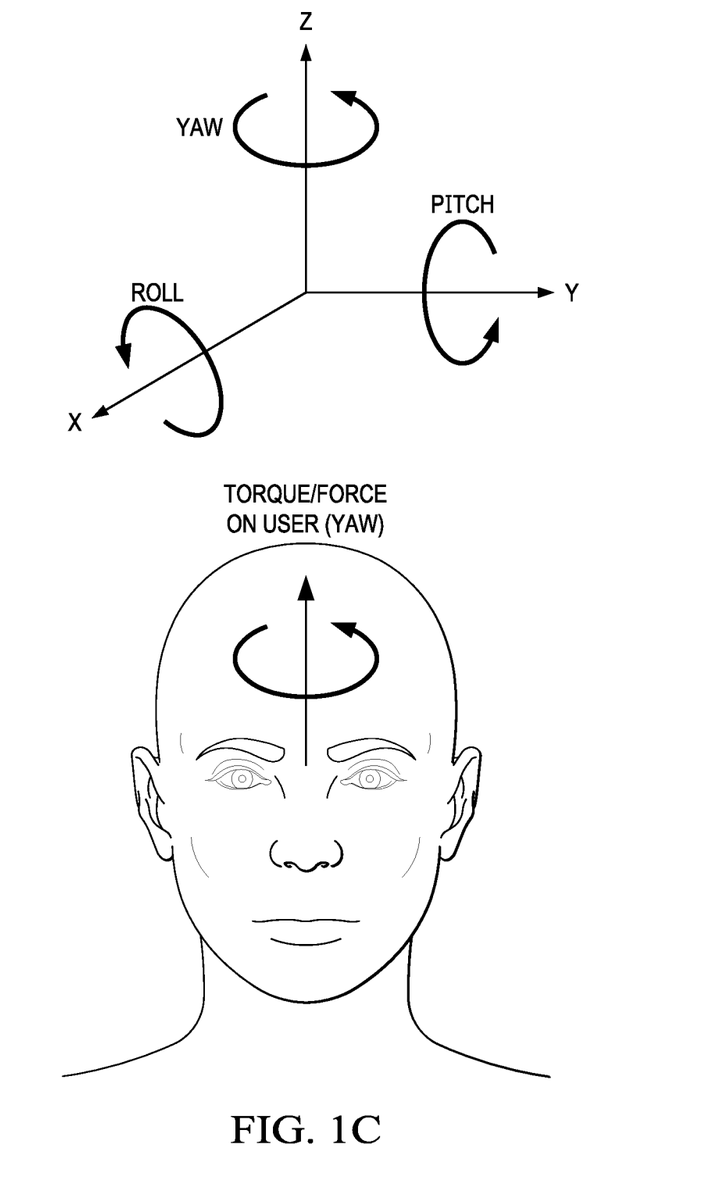

FIGS. 1A-1C illustrate a gyroscopic precession engine for providing torque/force on a user's head, according to an embodiment. FIG. 1A is a side view of the gyroscopic precession engine 100 and FIG. 1B is a perspective view of the gyroscopic precession engine 100. FIG. 1C illustrates a head-centered coordinate system with yaw, pitch and roll axes.

The gyroscopic precession engine 100 includes servo motor 102, rotatable wheel mount 103, spinning wheel 104 and wheel motor 105. Gyroscopic precession engine 100 can be attached to wearable device 101, such as an HMD. As described below and shown in FIGS. 2A-2C, the gyroscopic precession engine 100, when worn by a user, applies a gentle torque on the user's head in response to a trigger event. Wearable device 100 can be worn on the head or as part of a helmet, headband or smart glasses that has a small display optic in front of one or both of the user's eyes. Wearable device 100 can be used in a variety of applications, including but not limited to: spatial guidance (e.g., for generating a continuous force/torque to guide the user's head as a guiding force), sound enhancement (e.g., to improve the feeling of sound in gaming or a movie, such as air wave pressure feeling from an explosion in a scene), haptic notification (e.g., provide a pulsing force to indicate an incoming communication or other force feedback), gaming (e.g., providing sensations, such bumpy ride on a rollercoaster, car-racing centrifugal force, etc.), head/neck/hand/wrist exercise (e.g., providing a counter torque), ergo correction (e.g., notify and guide user to fix bad sitting or standing postures during long hour usage), handhold input device for force feedback (e.g., object interaction in VR content, such as boxing an object with reaction force feedback), aviation, engineering, medicine, or any other application that could benefit from the sensation provided by continuous force/torque. In an embodiment, wearable device 100 can be a VR headset that includes an inertial measurement unit (IMU) and a transparent wearable display that reflects projected images.

Figure 2A:
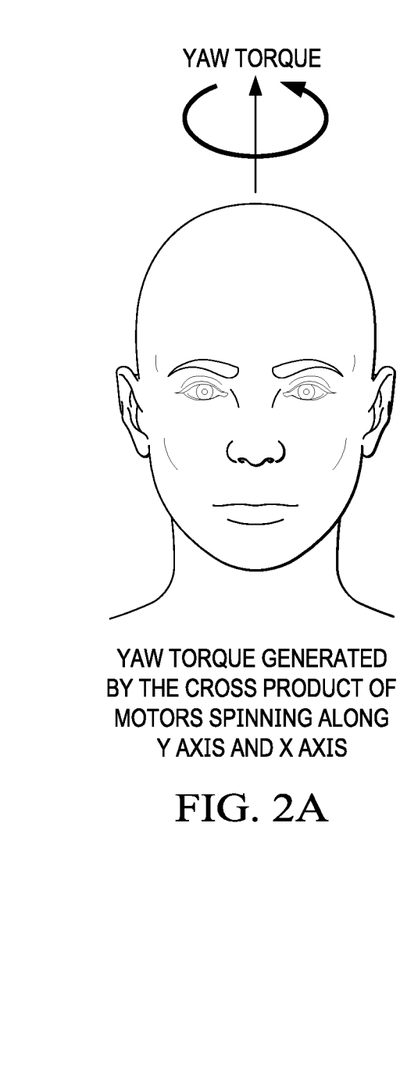
FIGS. 2A-2C illustrate various configurations for torque direction in a head-centered coordinate system are shown, according to an embodiment.
Figure 2B:
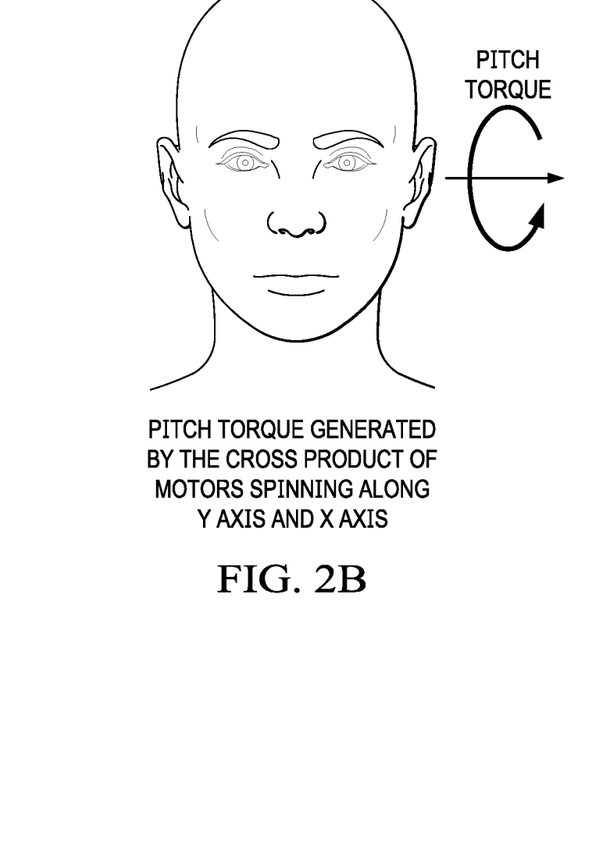
Figure 2C:
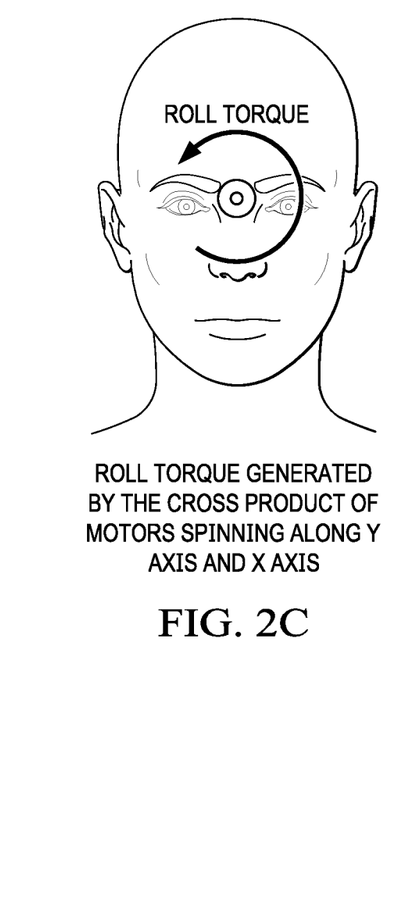

Gyroscopic precession engine 100 can be commanded by one or more control signals to provide a continuous force/torque sensation along one or more of yaw, pitch and roll axes of a head-centered coordinate system as shown in FIGS. 2A-2C, where the roll axis (x-axis) projects the user's nose, the yaw axis (y-axis) projects from the top of the user's head and the pitch axis projects from the left ear of the user's head in accordance with the right-hand rule. The configuration shown in FIG. 1B illustrates a torque/force sensation applied on a user's head on the yaw axis only, as shown in FIG. 1C. By adding another two precession engines, the design can provide torque/force sensation along roll, yaw and pitch axes.

In the example configuration shown in FIG. 1B, servo motor 102 rotates wheel mount 103 clockwise or counterclockwise. Spinning wheel 104 is rotatably coupled to wheel mount 103. Spinning wheel 104 is rotated by wheel motor 105 attached to wheel mount 103. Spinning wheel 104 is configured, when spinning, to move in free space in response to a torque produced by a product of a first angular velocity of wheel mount 103 and a second angular velocity and moment of inertia of spinning wheel 104, as described in Equation [1]:

$$T_{prec} = \omega_m \times I_s \times \omega_s \times \sin(\theta),  \quad [1]$$

where $T_{prec}$ is the torque on the user's head due to gyroscopic precession, $\omega_m$ is the angular velocity of wheel mount 103, $\omega_s$ is the angular velocity of spinning wheel 104, $I_s$ is the moment of inertia of spinning wheel 104, $\theta$ is the angle between the spin axis and the axis of precession and "x" indicates multiplication. In the configuration shown, $\theta$ is 90°, so the sine term is equal to one. Note that Equation [1] is for a single axis (e.g., the yaw axis) and can be extrapolated to three dimensions using linear system equations and vector notation as known to those skilled in the art. The angular velocity $\omega_m$ of the wheel mount can be continuous or discrete (stepped).

Because there is latency to create the torque if the wheel 104 is not spinning at the beginning of the trigger event. In an embodiment, to reduce the latency, the spinning wheel 104 will have an idle spinning speed. Software and/or hardware software predetermines an ideal spinning speed (torque reserve) of the spinning wheel 104 based on an upcoming trigger event.

In an embodiment, wheel motor 105 can be any suitable high-speed motor that has a spinning shaft that is coupled to wheel mount 103. Wheel motor 105 can run continuously or be activated by a server or haptic controller (hereinafter referred to as a "motion controller") a specified amount of lead time before a content generated trigger event occurs. Servo motor 102 can be implemented using any suitable off-the-shelf or custom built servo motor that can provide bi-directional rotation of wheel mount 103 in response to a control signal (e.g., in response to a pulse-width modulation (PWM) control signal) provided by the motion controller. In an embodiment, the motion controller (not shown) can receive an encoder feedback signal from, for example, a rotary encoder (not shown), and send a control signal to servo motor 102 to rotate wheel mount 103 to a new angular position based on a desired motion profile using a specified amount of angular velocity. In other embodiments, motion controller implements an open loop control algorithm.

In an embodiment, a motion profile is provided to the motion controller by a processor in wearable device 101. Content played by wearable device 101 (e.g., immersive movie, game, virtual reality application) can include trigger event data (e.g., in a separate track, audio channel or audio object) for a trigger event that marks a time in the future when a force/torque is be applied by gyroscopic precession engine 100, such that the application of the force/torque is synchronized with the trigger event. For example, a scene in a movie where there is an explosion (a trigger event) could be marked with trigger event data that is decoded by a media player application. Based on the trigger event data an appropriate motion profile generated and/or retrieved from memory is sent by the processor to the motion controller. The motion controller then send the appropriate control signals to server motor 102 to implement the motion profile. The motion controller can be integrated with servo motor 102 or a separate circuit (e.g., a separate integrated circuit chip).

The trigger event data could include a specified start time and end time, time offset, duration, frame number or frame offset, and a desired direction (e.g., pitch, yaw, roll in a head centered coordinate system) in which the force/torque is to be applied. The motion profile can be provided to the motion controller a specified amount of time before the start time of the trigger event to account for delay in transmission from the processor to the motion controller and from the motion controller to the server motor and any other delays in the communication path, and thus ensure that gyroscopic precession engine 100 applies the force/torque in sync with the trigger event (i.e., apply torque in sync with the explosion). If, for example, an explosion occurs directly in front of the user, then the force could be applied along the pitch axis of the head-centered coordinate system. The motion controller generates a control signal (e.g., a PWM signal) based on the motion profile (e.g., a desired pitch rotation and rotation rate) and provides the control signal to servo motor 102. Server motor 102 receives the control signal and in response moves wheel mount 103 in accordance with the motion profile, generating the specified force/torque along the pitch axis at the specified start time to achieve a specified pitch angle at a specified pitch rate. A predetermined mapping between the control signal and the angular position of wheel mount 103 to deliver a certain amount of force/torque can be determined empirically and stored in, for example, flash memory of server motor 102 and/or another device.

In many applications, it is desirable for gyroscopic precession engine 100 to have a small form factor, so that it can be mounted to wearable device 101 without making wearable device 101 too cumbersome or heavy for the user to wear for an extended period of time. In an embodiment, a small form factor gyroscopic precession engine 100 could have the following example parameters from Equation [1]: $\omega_m$=628 rad/s, $\omega_s$=200 rad/s and $I_s$=0.000001 kg m$^2$. These values would provide $T_{prec}$=0.18 NM. Assuming a user head radius R=0.09 m, the force F on the user's head would be F=2.0 N (F=$T_{prec}$/R=0.18/0.09=2.0 N), which is a force strong enough to be felt by the user. In some embodiments, spinning wheel 104 has a radius that is less than or equal to 0.03 meters (e.g., 0.01 m) and a thickness that is less than or equal to 0.01 meters (e.g., 0.01 m). These wheel dimensions are examples and any suitable wheel dimensions can be used that result in enough torque to be felt by the user desire and achieve a small form factor based on the application.

In an embodiment, wearable device 101 can include a support structure (e.g., made of plastic) including at least one attachment mechanism (e.g., screws, adhesive) for attaching the support structure to a human body part. Wearable device 101 can also include padding that is configured in at least one of shape, size, weight and location to act as a counterbalance to the weight contributed by gyroscopic precession engine 100 to improve user comfort. The support structure can also include other structures to assist in amplifying or directing the force/torque more efficiently to the user's head or other body part. For example, a controllable mechanical torque amplifier and/or torque redirector can be built into the support structure to amplify and/or redirect the force/torque in a particular direction using techniques known by those skilled in the art.

Referring to FIGS. 2A-2C, various configurations for torque direction in a head-centered coordinate system are shown, according to an embodiment. FIG. 2A illustrates generating yaw torque by a cross product of gyroscopic precession engines spinning along the y-axis and x-axis. FIG. 2B illustrates generating pitch torque by a cross product of gyroscopic precession engines spinning along the z-axis and x-axis. FIG. 2C illustrates generating roll torque by a cross product of gyroscopic precession engines spinning along the y-axis and z-axis. Thus, by operating pairs of gyroscopic precession engines simultaneously torque can be generated in three directions (roll, pitch and yaw) in a head-centered coordinate system, as shown in FIGS. 2A-2C.

Figure 3:
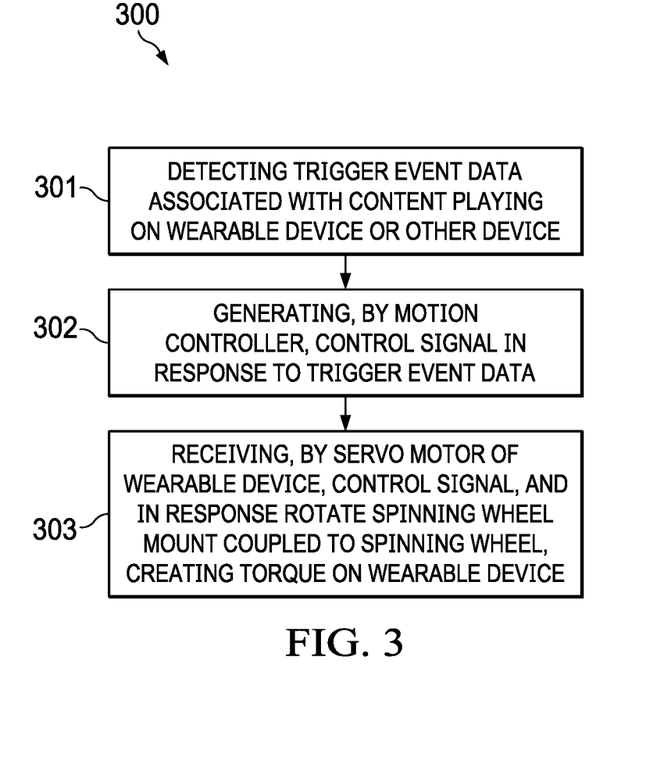
FIG. 3 is a flow diagram of a process that uses a gyroscopic precession engine to provide continuous torque/force, according to an embodiment.

FIG. 3 is a flow diagram of immersive application process 300 that uses a gyroscopic precession engine to provide continuous torque/force, according to an embodiment. Process 300 can be generated by wearable device 101 with gyroscopic precession engine 100 as described in reference to FIGS. 1A-1C and FIGS. 2A-2C.

Process 300 begins by detecting trigger event data associated with content playing on wearable device or other device (301). For example, the wearable device can be a HMD, the content can be a virtual reality application or a game and the trigger event data can include but is not limited to a start time, end time, time offset, duration, frame number or frame offset, indicating when in the running or elapsed time of the content a force/torque is to be applied by a gyroscopic precession engine. For example, a trigger event indicated by the trigger event data can be an explosion and the force/torque is applied to the user through the wearable device, such that the user perceives an air pressure wave sensation caused by the explosion.

Process 300 continues by generating, by a motion controller, a control signal in response to the detected trigger event data (302). For example, the control signal can indicate a motion profile that includes angular velocity.

Process 300 continues by receiving, by a server motor coupled to the motion controller, the control signal and, in response, rotates a wheel mount coupled to a spinning wheel, thereby creating a force/torque on the wearable device (303).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A wearable device comprising:
   a support structure including at least one attachment mechanism for attaching the support structure to a human body part;
   at least one gyroscopic precession engine coupled to the support structure, the gyroscopic precession engine, comprising:
     a first motor configured to rotate a wheel mount at a first angular velocity;
     at least one wheel rotatably coupled to the wheel mount and configured to spin at a second angular velocity;
     a second motor configured to spin the wheel at the second angular velocity based on an upcoming trigger event; and
     at least one motor controller coupled to the first motor and the second motor, the at least one motor controller configured to detect that the trigger event has occurred and rotate the wheel mount at the first angular velocity;
   wherein the wheel mount is configured to move in free space in response to a torque produced by a product of the first angular velocity of the wheel mount, the second angular velocity and a moment of inertia of the wheel, and
   wherein the support structure moves in response to a force produced by the torque.

2. The wearable device of claim 1, further comprising:
   a motion controller coupled to the first motor and configured to provide a control signal to the first motor indicative of a motion profile.

3. The wearable device of claim 2, wherein first motor is a server motor that receives the control signal and in response rotates the wheel mount in accordance with the motion profile.

4. The wearable device of claim 3, wherein the wheel has a radius that is less than or equal to 0.03 meters and a thickness that is less than or equal to 0.01 meters.

5. The wearable device of claim 3, wherein the angular velocity of the wheel mount is greater or equal to 600 radians per second and the angular velocity of the wheel is greater than or equal to 200 radians per second.

6. The wearable device of claim 1, wherein the wearable device is a head-mounted display and the human body part is a human head.

7. The wearable device of claim 6, wherein the attachment mechanism further comprises padding that is configured to be disposed between the head-mounted display and the user's head.

8. The wearable device of claim 7, wherein at least one of a size, weight, shape or location of the padding is configured to provide a counterbalance to a weight of one or more gyroscopic precession engines.

9. The wearable device of claim 1, wherein the support structure includes a mechanical torque amplifier or redirector for amplifying or redirecting the torque.

10. The wearable device of claim 1, wherein the wearable device includes three gyroscopic precession engines that provide three forces along three mutually orthogonal directions to generate yaw, pitch and roll rotations.

11. A method comprising:
    generating, by a motion controller coupled to a wearable device, a first control signal in response to an upcoming trigger event associated with content playing on the wearable device or another device;
    responsive to the first control signal, spinning a wheel coupled to a wheel mount at an idle speed;
    detecting, with a processor of a wearable device, trigger event data for the trigger event;
    generating, by a motion controller, a second control signal in response to the detected trigger event data; and
    receiving, by a server motor coupled to the wearable device, the second control signal and, in response to the second control signal, rotating the wheel mount at an angular velocity, thereby applying a force on the wearable device in a specified direction.

12. The method of claim 11, wherein the wearable device is a head-mounted display and the trigger event data indicates when the force is to be applied to the wearable device, so as to be in sync with the trigger event.

13. The method of claim 11, wherein the second control signal includes a motion profile that indicates at least one axis of rotation in a head-centered coordinate system to be affected by the force.

14. The method of claim 11, wherein the trigger condition data includes at least one of a trigger event start time, time offset, duration, frame number or frame offset associated with running or elapsed time of the content.

\* \* \* \* \*